INVENTOR.
EDWARD L. NASH
HIS ATTORNEY

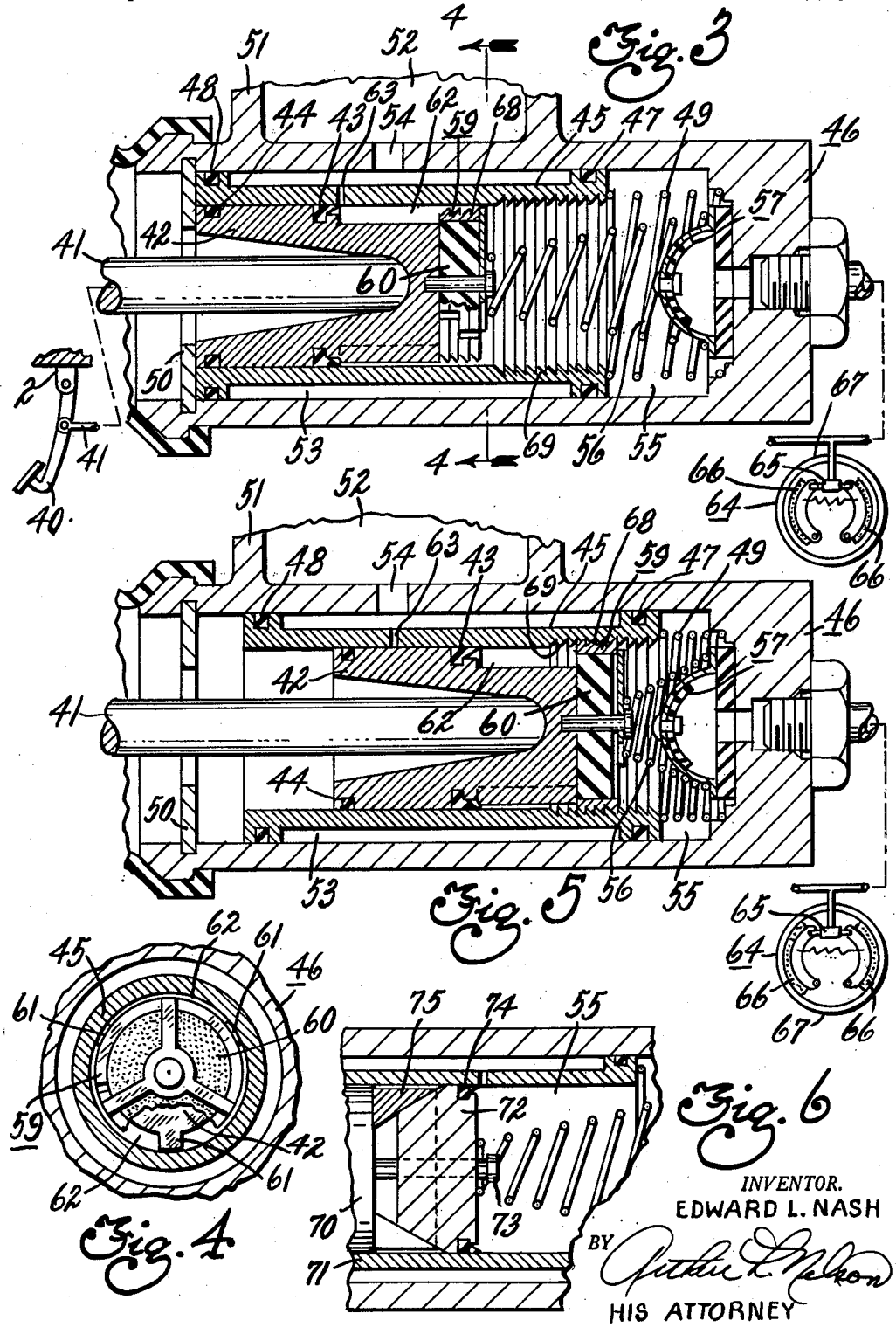

United States Patent Office

3,070,961
Patented Jan. 1, 1963

3,070,961
MASTER CYLINDER
Edward L. Nash, Farmington, Mich., assignor to General Motors Corporation, Detroit, Mich., a corporation of Delaware
Filed Apr. 6, 1961, Ser. No. 101,145
11 Claims. (Cl. 60—54.6)

This invention relates to a fluid pressurizing system and more particularly to a master cylinder for pressurizing fluid within the system.

The conventional master cylinder used for pressurizing fluid within a hydraulic fluid brake actuating system operates in combination with a single piston. During the initial portion of the stroke of the piston a lower pressure of fluid is needed than in the subsequent portion of the stroke in actuating the vehicle brakes. The initial portion of the stroke expands the brake shoes to frictionally engage the brake drum. The subsequent portion of the stroke of the piston sets the shoes firmly against the drum and thereby retards the rotation of the drum.

Excessive pressures may be built up on a manually operated master cylinder under a panic situation during the subsequent portion of the stroke. The sudden jamming of the brake pedal causes extremely high pressure within the master cylinder and the fluid system. These high pressures may be dangerous particularly where the fluid couplings and seals are not in first class condition.

Accordingly this invention is intended to provide multiple stage pressure operation of the hydraulic master cylinder. The multiple stage provides high volume low pressure initial displacement and low volume high pressure subsequent displacement. An added safety feature is to limit the excessive pressure during the subsequent portions of the stroke. The excessive pressure provides no useful purpose and merely skids the vehicle wheels which provides less braking effort than if the proper pressure were maintained in the fluid system when the vehicle brakes are actuated.

It is an object of this invention to provide a multiple pressure stage master cylinder for operating within the hydraulic fluid brake system.

It is another object of this invention to provide a pressure control device to limit peak output pressure from a master cylinder pressurizing fluid in a hydraulic fluid brake actuating system.

It is a further object of this invention to include pressure responsive elements in a master cylinder to control the output pressure in a hydraulic fluid system.

The objects of this invention are accomplished by employing a multiple piece master piston operating within a hydraulic master cylinder. The master cylinder includes a sleeve and a piston operating within a master cylinder. The sleeve is biased to move as a unit with the piston during initial pedal operation. In this manner the high volume low pressure fluid displacement is accomplished for engaging the brake shoes with the brake drum. At this point in brake actuation the pressure increases in the system and the piston moves relative to the sleeve and higher pressure is developed by the movement of the piston. When excessively high pressures are developed in the master cylinder the sleeve retracts to a point where the spring biasing the sleeve is completely compressed and the piston and the sleeve again move forward as the unit. In this manner if an extremely high force is employed to move the master piston and sleeve the pressure in the master cylinder will cause the piston and sleeve to revert to unitary movement. With the unitary movement of the sleeve and piston the peak pressure is reduced in the master cylinder.

A modification provides fluid displacement at a constant rate during initial movement of the master piston. The sleeve which receives the piston moves only to reduce the peak output pressure in the subsequent portion of the pedal movement. The sleeve engages a ratchet means on the forward end of the piston which operates in response to a pressure within the master cylinder and engages the sleeve to move a larger effective area within the master cylinder to reduce the peak output pressure.

Further objects and advantages of the present invention will be apparent from the following description, reference being had to the accompanying drawings wherein preferred embodiments of the present invention are clearly shown.

In the drawings:
FIGURE 1 is a cross-section view showing the sleeve and master piston in their normally retracted position in the master cylinder.

FIGURE 3 is a cross-section of a modified version employing a piston and sleeve having two-stage operation.

FIGURE 4 is a cross-section view taken on line 4—4 of FIGURE 3.

FIGURE 5 is a cross-section view of the modified version showing the sleeve and piston in the operating position.

FIGURE 6 is a cross-section view of a second modified version showing a different manner for locking the piston and sleeve to move in unison.

Figure 1:
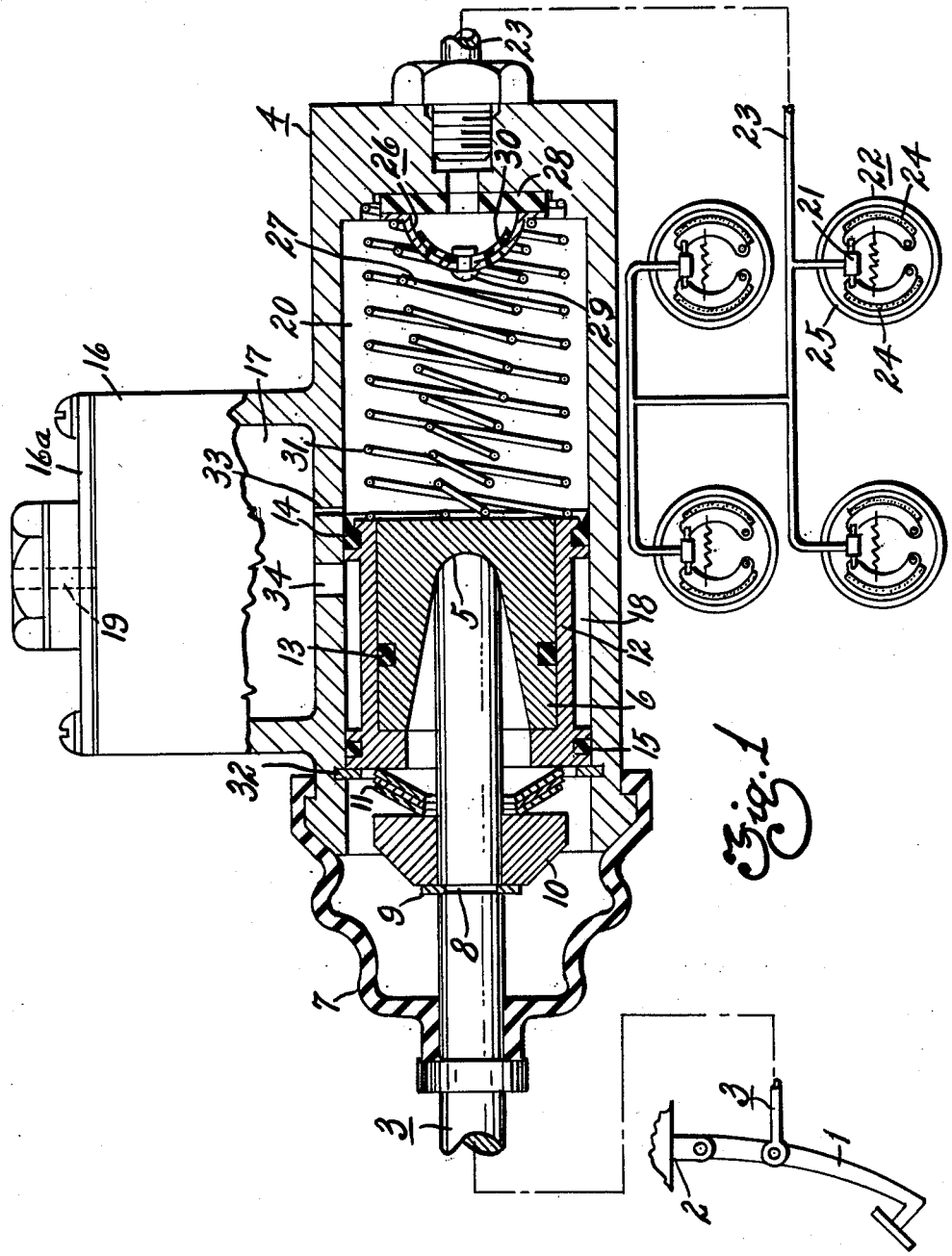

Referring to FIGURE 1 the original device will be described. The brake pedal 1 is pvotably mounted on the chassis 2 and pivotably connected to the push rod 3. The push rod 3 extends into the master cylinder 4. The forward end of the push rod 3 forms a hemispherical portion received within a mating hemispherical recess 5 in the piston 6. A boot 7 is positioned on the push rod 3 and engages the outer periphery of the master cylinder 4. The push rod 3 is formed with an annular recess 8 on its outer periphery for reception of a snap ring 9. The snap ring 9 retains the washer 10 in an engaging position with the plurality of Belleville springs 11 on the push rod 3. The three Belleville springs as indicated are compressibly positioned between the sleeve 12 and the washer 10.

During the initial portion of brake actuation the pedal moves the push rod 3 forwardly and the springs 11 which are compressibly positioned between the washer 10 and sleeve 12 move the sleeve forwardly in unison with the piston 6. A seal 13 is positioned between the sleeve 12 and the piston 6. A primary seal 14 and a secondary seal 15 are carried on the sleeve 12 forming a seal between the sleeve 12 and the inner periphery of the master cylinder 14.

The master cylinder 4 is formed integral with the reservoir 16 which forms a reservoir chamber 17. The reservoir 16 carries the cover 16a which is provided with a venting 19. The reservoir chamber 17 is in communication with the vented chamber 18 within the master cylinder 4 and the outer periphery of the sleeve 12.

The reservoir chamber 17 is also in communication with the pressurizing chamber 20 on the forward side of the master piston 6 and sleeve 12. The pressurizing chamber 20 is in controlled communication to the plurality of wheel cylinders 21 in the vehicle brakes 22 through conduit means 23. The brake shoes 24 are shown retracted from the brake drum 25 when the fluid within the pressurizing chamber 20 is in communication with the reservoir chamber 17 and the atmosphere.

The check valve assembly 26 is positioned in the forward end of the master cylinder 4. The check valve 26 retains a residual pressure in the wheel cylinders 21. The retraction spring 27 is seated on the valve assembly 26 and compressably positioned against the forward end of the master piston 6.

As fluid is pressurized within the pressurizing chamber 20 the fluid is permitted to pass through the check valve assembly 26 into the plurality of wheel cylinders 21 to actuate the vehicle brakes. The check valve assembly is seated on a washer 28 which is formed of a resilient material. The check valve assembly includes a rivet 29 and a resilient element 30 maintained in position by the rivet 29.

The sleeve 12 is biased to a rearward position by the coil spring 31 which seats on the forward end of the master cylinder 4 and the forward side of the sleeve 12. The coil spring 31 being in the compressed position biases the sleeve to a contacting position on the return stop formed by the snap ring 32 in the rearward end of the master cylinder 4.

As the sleeve 12 is maintained in its rearwardly retracted position the vent 33 provides communication between the reservoir chamber 17 and the pressurizing chamber 20 in the master cylinder. The port 34 provides communication between the reservoir chamber 17 and the vented chamber 18 in the master cylinder 4.

Figure 2:
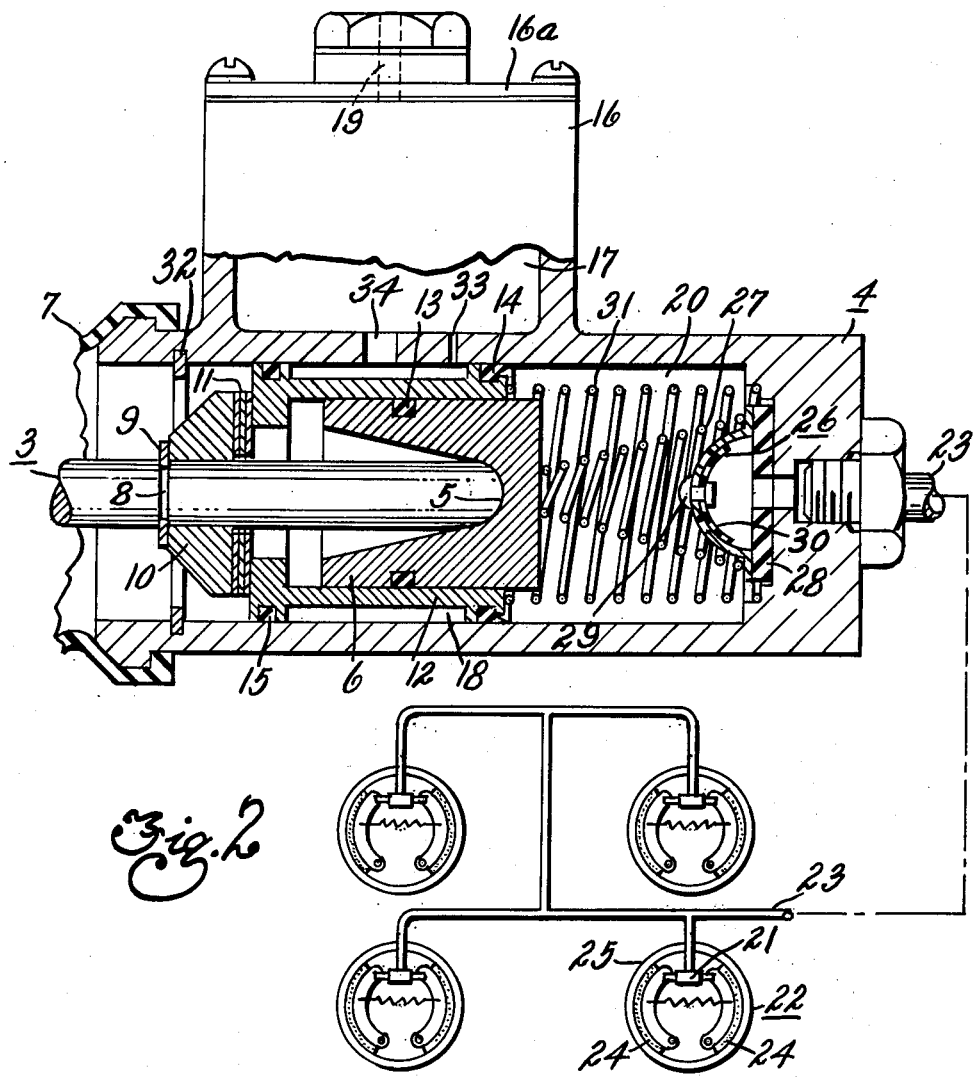
FIGURE 2 is a cross-section view of the master piston and sleeve in their actuated position in the master cylinder.

Referring to FIGURE 2 the sleeve 12 and the master piston 6 are moved forwardly by the actuating force of push rod 3. The pressure within the pressurizing chamber 20 is sufficient to bias the sleeve 12 rearward relative to the piston 6 thereby compressing the Belleville springs 11. In this position the piston 6 and the sleeve 12 again move forwardly as a unit. The forward movement of the piston 6 and sleeve 12 provides a larger effective area for pressurizing fluid within the master cylinder 4. In this position the peak pressure delivered from the master cylinder 4 is limited due to the larger area operating to pressurize fluid in the chamber 20. The brake shoes 24 are expanded to engage the inner periphery of the brake drum 25 as the vehicle brakes are actuated.

Referring to FIGURE 3 a modification is illustrated. The brake pedal 40 is pivotably mounted on the chassis 2 and pivotably connected to the push rod 41. The push rod 41 engages the hemispherical socket in the piston 42. The piston 42 is formed with two annular recesses receiving the seals 43 and 44 forming seals between the piston 42 and the sleeve 45.

The sleeve 45 is slidably mounted within the master cylinder 46. The seals 47 and 48 form seals between the outer periphery of the sleeve 45 and the master cylinder 46. The sleeve 45 is biased to a normally retracted position by the coil spring 49. In the retracted position the sleeve 45 engages the snap ring 50 which is received within an annular recess on the rearward end of the master cylinder 46. The master cylinder 46 is formed integral with the reservoir 51 which forms a reservoir chamber 52. The vented chamber 53 formed by the master cylinder 46 and the sleeve 45 is vented to a reservoir chamber 52 through the port 54. During normal brake operation the sleeve 45 is retained in its rearwardly retracted position by the spring 49. The sleeve 45 moves forwardly only when a certain predetermined pressure is present within the pressurizing chamber 55.

The piston 42 is biased to a rearwardly retracted position by the coil spring 56 which is seated on the check valve 57 on the forward end of the master cylinder 46.

The ring 59 is slit to permit radial expansion of the ring as the annulus 60 is compressed axially. The plurality of ridges 61 define clearance passages 62 between the ridges and the inner periphery of the sleeve 45. The ridges 61 are annularly spaced about the outer periphery on the forward end of the piston 42 to form a chamber in communication with the vent 63. In this manner as the piston 42 is in its normally retracted position communication is present between the reservoir chamber 52 and the pressurizing chamber 55.

The check valve 57 is of the conventional type which permits the flow of fluid from the pressurizing chamber 55 to the plurality of wheel cylinders 65 in the plurality of brakes 64. The brake shoes 66 are in their retracted position in spaced relation to the drum 67.

Normally the sleeve 45 remains in its retracted position during the operation of the vehicle brakes. If however, an excessive pressure is created within the pressurizing chamber 55 the sleeve 45 will be carried forwardly by the radial expansion of the annulus 60 which in turn radially expands the ring 59. The serration 68 on the ring 59 engages the mating serration 69 on the inner periphery of the sleeve 45. This engagement provides for forward movement of the piston 42 and sleeve 45 as a unit. In this manner the total area of the piston and the sleeve is the effective pressurizing area within the pressurizing chamber 55.

FIGURE 5 illustrates the brake 64 in its actuated position with the sleeve and piston moved forwardly pressurizing fluid in the pressurizing chamber 55.

FIGURE 6 illustrates a modification of an expanding element to lock the piston 70 and the sleeve 71 together to move forwardly as a unit. The plunger 72 is connected to the piston 70 by the rivet 73. The plunger 72 carries a seal 74 to maintain a pressure on the forward side of the plunger 72. When an excessive pressure exists within the pressurizing chamber 55 the plunger 72 is biased to a rearward position expanding the ring 75 radially outward to engage the inner periphery of the sleeve 71. In this manner the sleeve 71, and the piston 70 and plunger 72 are locked together and move forwardly as a unit increasing the effective area for pressurizing fluid in the master cylinder. The increased effective area reduces the unit pressurization of fluid in the pressurizing chamber for a given force supplied on the brake pedal.

The operation of the device will be described in the following paragraphs. Referring to FIGURES 1 and 2 as the brake pedal 1 is depressed the piston 6 and sleeve 12 move forwardly as a unit. The piston 6 is engaged by the forward end of the push rod 3 and the sleeve 12 moves forwardly due to the force transmitted by the Belleville springs 11 compressibly positioned between the washer 10 and the sleeve 12. The seal 14 moves by the vent 33 causing a pressurization of fluid within the pressurizing chamber 20. The piston and sleeve continue to move forwardly increasing the pressure in the master cylinder and the plurality of wheel cylinders 21. The increase in pressure in the wheel cylinders 21 causes the brake shoes 24 to expand radially and frictionally engage the inner periphery of the drum 22. Upon engagement of the brake shoes with the drum the pressure in the system increases. With an increase in pressure within the pressurizing chamber 20 of the master cylinder 4 the sleeve 12 compresses the springs 11 and permits the piston 6 to move forwardly relative to the sleeve 12. During this portion of the braking cycle an increased pressure is created by the movement of the piston 6 relative to the sleeve. The increase in pressure is due to the fact that the effective area of the piston 6 in the pressurizing fluid is smaller than the sleeve and the piston. In this manner with a given force on the push rod 3 the pressurization in chamber 20 is greater.

In event of a panic stop the brake pedal 1 and push rod 3 are jammed forwardly creating a sudden increase in pressure within the pressurizing chamber 20. With this sudden increase in pressure the peak pressure in the fluid system may reach excessive limits. The sleeve 12 however, can move rearwardly relative to the piston thereby seating the springs 11 firmly on the washer 10. In this position the full area of the sleeve 12 and piston 6 is the effective area for pressurizing fluid. With unitary movement of the piston and sleeve during the subsequent portion of the stroke the excessive peak pressure in the system is eliminated. This position for the master piston 6 and sleeve 12 is shown in FIGURE 2.

As the vehicle brakes are retracted the pedal 1 returns permitting the return movement of the sleeve 12 and piston 6 due to the biasing force of the springs 31 and 27 respectively. The Belleville springs again expand to their originally retracted position as indicated in FIGURE 1. The sleeve and piston return to their normally retracted position as shown in FIGURE 1.

Referring to the FIGURES 3, 4, and 5 the modification is illustrated. The piston 42 during normal brake actuation moves forwardly within the sleeve 45 pressurizing fluid within the master cylinder pressurizing chamber 55. The pressurization of fluid within the chamber 55 actuates the vehicle brakes in a normal manner. If however, an excessive pressure is encountered by the piston 42 during its forward movement within the chamber 55 the pressure axially compresses the annulus 60. The annulus 60 compresses axially and expands radially causing the radial expansion of the ring 59. At this point the ring 59 is positioned adjacent the serration on the sleeve 45. With an expansion of the ring 59 the serration 68 on the ring 59 engages a mating serration 69 on the sleeve 45. The engagement of the serrations locks the sleeve and piston together to move forwardly as a unit. The increased effective area of the piston and sleeve diminishes the pressure in the pressurizing chamber 55. In this manner a peak pressure in the fluid system is reduced in proportion to the increased area caused by the locking of the ring 59 with the sleeve 45. It can be seen that a peak fluid line pressure is substantially reduced by this type of a mechanism.

FIGURE 6 illustrates a similar expandable ring 75 which is expanded upon increase in pressure in the pressurizing chamber 55. As the ring 75 expands and engages the inner periphery of the sleeve 71 it causes a locking condition between the sleeve 71 and piston 70. The locking of these two elements causes an increased effective area for pressurizing fluid and substantially reduces the peak line pressure for brake actuation during a panic stop.

While the embodiments of the present invention as herein disclosed, constitutes preferred forms, it is to be understood that other forms might be adopted.

What is claimed is as follows:

1. A fluid pressurizing means for use in a hydraulic fluid brake actuating system comprising in combination, a master cylinder adapted for communication with the hydraulic fluid brake actuating system, a master piston, a control means engaging said master piston, a sleeve concentrically mounted within said master cylinder and receiving said piston, a spring compressibly mounted between said control means and said sleeve to bias said sleeve to move as a unit with said piston during initial portion of brake actuation, said spring permitting relative movement between said piston and said sleeve to increase the unit pressurization in said master cylinder during the intermediate portion of the stroke and movement as a unit upon complete compression of said spring during the subsequent portion of the stroke when the vehicle brakes are actuated.

2. A fluid pressurizing means for use in a hydraulic fluid brake actuating system comprising in combination, a master cylinder adapted for communication with a hydraulic fluid brake actuating system, a master piston, a control means engaging said master piston, a sleeve concentrically mounted around said piston and within said master cylinder, a spring compressibly positioned between said control means and said sleeve, means for biasing said sleeve and said master piston to a normally retracted position, said master piston and said sleeve moving forwardly in response to movement of said control means as a unit during initial portion of the brake actuating cycle and permitting relative movement between said sleeve and said piston during the intermediate portion of said stroke and unitary movement of said piston and said sleeve during the subsequent portion of said stroke as said spring compresses to limit the peak pressure in said hydraulic fluid system as said vehicle brakes are actuated.

3. A fluid pressurizing means for use in a hydraulic fluid brake actuating system comprising in combination, a master cylinder, a master piston, control means engaging said master piston, a sleeve concentrically located within said master cylinder receiving said master piston, means for biasing said sleeve and said piston to a normally retracted position, resilient means compressively positioned between said sleeve and said control means biasing said sleeve to move forwardly with said piston during initial forward movement of said master piston, said resilient means compressing to provide a moveable connection between said control means and said sleeve and permit relative movement of said sleeve and said piston to increase the unit pressurization in said master cylinder for a given input force from said control means, said sleeve completely compressing said resilient means to provide solid connection between said sleeve and said control means in said master piston to reduce the peak output pressure during the subsequent portion of the forward movement of said master piston when said vehicle brakes are operated.

4. A hydraulic fluid pressurizing means for use in a hydraulic fluid brake actuating system comprising in combination, a master cylinder, a sleeve concentrically located within said master cylinder, means for biasing said sleeve to a normally retracted position, a piston means concentrically located within said sleeve, means for biasing said piston means to a normally retracted position, said piston means moving forwardly in said master cylinder to provide pressurization of fluid, and a resilient member on said piston means engaging said sleeve to move said sleeve forwardly as a unit with said piston during the subsequent portion of the piston stroke to limit the peak pressure of said hydraulic fluid system when the brakes are actuated.

5. A fluid pressurizing means for use in a hydraulic fluid brake actuating system comprising in combination, a master cylinder, a sleeve concentrically located within said master cylinder, means for biasing said sleeve to a normally retracted position in said master cylinder, a piston means received within said sleeve, manual means controlling the forward movement of said piston means in said sleeve, said piston pressurizing fluid in said master cylinder, and resilient means on said piston means engaging said sleeve and providing unitary movement of said piston and said sleeve during the subsequent portion of the stroke of said piston thereby limiting the peak pressure of said master cylinder when the brakes are actuated.

6. A fluid pressurizing means for use in a hydraulic fluid brake actuating system comprising in combination, a master cylinder, a sleeve concentrically located within said master cylinder, means biasing said sleeve to a normally retracted position, a master piston positioned in said sleeve, manual means engaging said piston for operating said piston, means for biasing said piston to a normally retracted position, a resilient member disposed on the forward end of said master piston, a radially expandable element positioned on the outer periphery of said resilient member, said resilient member expanding radially in response to axial compression by hydraulic fluid in said master cylinder to lock said piston and said sleeve together when a predetermined pressure exists in said master cylinder thereby eliminating excessive pressures developing in said master cylinder when said vehicle brakes are actuated.

7. A fluid pressurizing means for use in a hydraulic fluid brake actuating system comprising in combination, a master cylinder, a sleeve concentrically located within said master cylinder, resilient means biasing said sleeve to a normally retracted position, a piston concentrically located within said sleeve, means biasing said piston in a normally retracted position in said sleeve, manual means controlling the operation of said master piston in said cylinder, a radially expandable element disposed on the forward end of said master piston, and means for radially expanding said element into driving engaging relation with said sleeve in response to pressure in said master cylinder when said vehicle brakes are operated so that said master piston and said sleeve are further operated as a unit, thereby eliminating excessive pressure in said master cylinder when said vehicle brakes are actuated.

8. A fluid pressurizing means for use in a hydraulic fluid brake actuating system comprising in combination, the master cylinder, a sleeve mounted concentrically within said master cylinder, means for biasing said sleeve to a normally retracted position, a master piston positioned within said sleeve, means biasing said piston to a normally retracted position, a radially expandable element on said piston, means positioned on the forward end of said master piston to expand said element in response to the presence of a predetermined pressure in said master cylinder thereby locking said piston and said sleeve and increasing the effective pressurizing area on said master piston, said increase in said effective area reducing unit pressure and eliminating the danger of excessive pressures being developed in said master cylinder when said vehicle brakes are operated.

9. Hydraulic fluid pressurizing means for use in a hydraulic fluid brake pressurizing system, said pressurizing means comprising, a master cylinder, a sleeve reciprocably received in said cylinder, means biasing said sleeve to a normally retracted position, a piston reciprocably received in said sleeve, means biasing said piston to a normally retracted position, said cylinder and sleeve and piston defining a fluid pressurizing chamber, means responsive to the pressure of fluid being pressurized in said chamber and acting on said sleeve to permit a stage of pressurizing movement of said piston relative to said sleeve followed by a stage of unitary pressurizing movement of said piston and said sleeve, said fluid pressure responsive means including a radially expandable member on said piston means engaging said sleeve during said stage of unitary pressurizing movement to limit the peak pressure in said pressurizing chamber.

10. Hydraulic fluid pressurizing means for use in a hydraulic fluid brake actuating system comprising in combination, a master cylinder, a sleeve concentrically located within said master cylinder, means for biasing said sleeve to a normally retracted position, a piston means concentrically located within said sleeve, means for biasing said piston means to a normally retracted position, said piston means moving forwardly in said master cylinder to provide pressurization of fluid, and a resilient member operatively mounted to move with said piston means and engaging said sleeve to move said sleeve forwardly as a unit with said piston during a subsequent portion of the piston forward movement to limit the peak pressure of said hydraulic fluid system when the brakes are actuated.

11. Hydraulic fluid pressurizing means for use in a hydraulic fluid brake pressurizing system, said pressurizing means comprising, a master cylinder, a sleeve reciprocably received in said cylinder, means biasing said sleeve to a normally retracted position, a piston reciprocably received in said sleeve, means biasing said piston to a normally retracted position, said cylinder and sleeve and piston defining a fluid pressurizing chamber, means responsive to the pressure of fluid being pressurized in said chamber and acting on said sleeve to permit a stage of pressurizing movement of said piston relative to said sleeve followed by a stage of unitary pressurizing movement of said piston and said sleeve, control means engaging said piston, and said fluid pressure responsive means including a spring compressably mounted between said control means and said sleeve to bias said sleeve to move as a unit with said piston during the initial pressurizing stage and permitting relative movement between said piston and said sleeve to increase the unit pressurization in said pressurizing chamber during said relative pressurizing movement stage and unitary movement upon complete compression of said spring.

References Cited in the file of this patent
UNITED STATES PATENTS

| | | |
|---|---|---|
| 1,369,915 | Church | Mar. 1, 1921 |
| 1,980,617 | Engel | Nov. 13, 1934 |
| 2,803,947 | Johnson et al. | Aug. 27, 1957 |